US010720250B2

(12) United States Patent
Bezlepkin et al.

(10) Patent No.: US 10,720,250 B2
(45) Date of Patent: Jul. 21, 2020

(54) CONTAINMENT INTERNAL PASSIVE HEAT REMOVAL SYSTEM

(71) Applicant: Joint-Stock Company Scientific Research and Design Institute for Energy Technologies Atomproekt, St. Petersburg (RU)

(72) Inventors: Vladimir Victorovich Bezlepkin, St. Petersburg (RU); Sergey Evgenivich Semashko, St. Petersburg (RU); Igor Mihaylovich Ivkov, St. Petersburg (RU); Sergey Borisovich Alekseev, St. Petersburg (RU); Teymuraz Georgievich Vardanidze, St. Petersburg (RU); Yuriy Yurievich Petrov, St. Petersburg (RU); Aleksander Sergeevich Solodovnikov, St. Petersburg (RU); Yuriy Vladimirovich Krylov, St. Petersburg (RU)

(73) Assignee: Joint-Stock Company Scientific Research and Design Institute for Energy Technologies Atomproekt (RU)

( * ) Notice: Subject to any disclaimer, the term of this patent is extended or adjusted under 35 U.S.C. 154(b) by 144 days.

(21) Appl. No.: 15/532,850

(22) PCT Filed: Nov. 16, 2015

(86) PCT No.: PCT/RU2015/000784
§ 371 (c)(1),
(2) Date: Jun. 2, 2017

(87) PCT Pub. No.: WO2016/089250
PCT Pub. Date: Jun. 9, 2016

(65) Prior Publication Data
US 2017/0372805 A1 Dec. 28, 2017

(30) Foreign Application Priority Data
Dec. 4, 2014 (RU) .............................. 2014148910

(51) Int. Cl.
*G21C 15/18* (2006.01)
*G21C 1/02* (2006.01)
(Continued)

(52) U.S. Cl.
CPC ............. *G21C 15/18* (2013.01); *G21C 1/028* (2013.01); *G21C 9/004* (2013.01); *G21C 13/036* (2013.01);
(Continued)

(58) Field of Classification Search
CPC ......... G21C 15/182; G21C 15/14; F28D 1/00; F28D 1/02; F28D 1/04; F28D 1/06;
(Continued)

(56) References Cited

U.S. PATENT DOCUMENTS 4,502,419 A * 3/1985 Smith, Jr. ............. F22B 37/228
122/32
4,648,354 A * 3/1987 Holcblat ................. F22B 37/18
122/32
(Continued)

FOREIGN PATENT DOCUMENTS

CN 103267423 A * 8/2013
RU 96104459 3/1998
(Continued)

OTHER PUBLICATIONS

Erentürk, Murat. The simulation of passive water hammer in pipes. Diss. Massachusetts Institute of Technology, 1996. <https://dspace.mit.edu/bitstream/handle/1721.1/38146/35651617-MIT.pdf?sequenc>. (Year: 1996).*
(Continued)

*Primary Examiner* — Lily C Garner
(74) *Attorney, Agent, or Firm* — Brandon V. Zuniga; James R. Gourley; Carstens & Cahoon, LLP

(57) ABSTRACT

The invention relates to the nuclear energy field, including pressurized water reactor containment internal passive heat
(Continued)

removal systems. The invention increases heat removal efficiency, flow stability in the circuit, and system reliability. The system has at least one cooling water circulation circuit comprising a heat exchanger inside the containment and including an upper and lower header interconnected by heat-exchange tubes, a riser pipeline and a downtake pipeline connected to the heat exchanger, a cooling water supply tank above the heat exchanger outside the containment and connected to the downtake pipeline, a steam relief valve connected to the riser pipeline and located in the water supply tank and hydraulically connected to the latter. The upper and lower header of the heat exchanger are divided into heat exchange tube sections on the assumption that: $L/D \leq 20$, L being the header section length, D being the header bore.

7 Claims, 3 Drawing Sheets

(51) Int. Cl.
| | |
|---|---|
| *G21C 9/004* | (2006.01) |
| *G21C 13/036* | (2006.01) |
| *G21D 3/02* | (2006.01) |
| *F28D 3/00* | (2006.01) |
| *F28C 3/04* | (2006.01) |
| *F28D 1/00* | (2006.01) |
| *G21C 15/14* | (2006.01) |
| *G21D 3/04* | (2006.01) |

(52) U.S. Cl.
CPC .................. *F28C 3/04* (2013.01); *F28D 1/00* (2013.01); *F28D 3/00* (2013.01); *G21C 15/14* (2013.01); *G21D 3/02* (2013.01); *G21D 3/04* (2013.01); *Y02E 30/32* (2013.01)

(58) Field of Classification Search
CPC ... F28D 1/053; F28D 3/00; F28D 3/02; F28D 7/16; F28C 3/04
See application file for complete search history.

(56) References Cited

U.S. PATENT DOCUMENTS

| | | | |
|---|---|---|---|
| 5,126,099 A | 6/1992 | Van Kuijk | |
| 5,303,274 A | 4/1994 | Sawyer | |
| 5,612,982 A * | 3/1997 | Woodcock | G21C 15/18 |
| | | | 376/298 |
| 2012/0048527 A1* | 3/2012 | He | F22B 1/18 |
| | | | 165/173 |
| 2014/0034743 A1* | 2/2014 | Zhadanovsky | F01K 17/02 |
| | | | 237/9 R |

FOREIGN PATENT DOCUMENTS

| | | |
|---|---|---|
| RU | 85029 | 7/2009 |
| RU | 85029 U1 * | 7/2009 |
| RU | 98060 U1 * | 9/2010 |

OTHER PUBLICATIONS

Gauthier, Frédéric, and P-E. Roche. "Evidence of a boundary layer instability at very high Rayleigh number." EPL (Europhysics Letters) 83.2 (2008): 24005. (Year: 2008).*

* cited by examiner

CONTAINMENT INTERNAL PASSIVE HEAT REMOVAL SYSTEM

CROSS-REFERENCE TO RELATED APPLICATIONS

The current application is a US 371 National Stage application from PCT/RU2015/000784 filed Nov. 16, 2015, which claims the benefit of priority application RU2014148910 filed Dec. 4, 2014, the disclosures of which are incorporated herein by reference in their entirety.

BACKGROUND OF THE INVENTION

Technical Field

The invention relates generally to the nuclear energy field, and more particularly to pressurized water reactor containment internal passive heat removal systems (C PHRS), and is designed for reactor containment cooling by natural circulation of the cooling liquid (water) in the system circuit.

Description of Related Art

According to the background of the invention, there are numerous designs of reactor containment heat removal systems based on natural heat circulation.

Russian patent RU2125744, G21C15/18 dated Jan. 27, 1999 discloses a system for passive heat removal from the nuclear reactor containment structure internal volume including the first heat exchanger located outside of the containment structure, the second heat exchanger inside the reactor containment structure. The first heat exchanger and second heat exchanger are hydraulically connected in a closed circuit by means of pipes with the coolant passing through the containment structure and the exhaust pipe above open to the atmosphere. The system also includes a tank filled with water to the set level that is connected to the containment structure and located near its upper wall. The first heat exchanger is immersed in the water in the tank and extended vertically from the base plate adjoining the bottom of the tank to the upper section dividing the tank into two hydraulically connected volumes. The tank is equipped with a cover shaping the first channel and the second channel, each covering its corresponding area formed by the vertical heat exchanger, and connected to the corresponding area only. One of the channels is connected to the outer air intake, the other is connected to the exhaust pipe, and the water in the tank blocks the connection between the channels when the tank is filled to the set level.

Russian patent RU2302674, G21C9/00 dated Jul. 10, 2007 discloses a containment heat removal system comprising a heat exchanger installed under the containment, its inlet and outlet passing through the containment and connected to the closed circulation circuit of low-boiling coolant, including a turbine with an electric generator, a power unit with a steam generator located under the containment, and power unit safety systems, one of which having a hydraulic unit and a steam water turbine. The heat exchanger is installed under the containment dome and is designed as two-tiered circular tubes connected by means of C-shaped finned tubes, the ends of the tubes facing the containment wall and enclosing the hydraulic unit to ensure power unit safety.

The closest analog of the claimed invention is the PHRS system disclosed in Russian utility model patent RU85029, G21C15/18 dated Jul. 20, 2009 and comprising a coolant circulation circuit, including at least one heat exchanger located inside the containment and a tank with coolant supply installed above the heat exchanger outside the containment interconnected by the inlet and outlet pipelines. The system is also equipped with a steam receiver installed in the coolant supply tank and hydraulically connected to the latter and connected to the outlet pipeline.

The disadvantage of the said devices is potential water hammer in the system.

SUMMARY OF THE INVENTION

The purpose of the invention is to provide a system for efficient heat removal from the reactor containment.

The technical result of the invention is increase of heat removal efficiency, flow stability in the circuit (no water hammer) and, consequently, system operation reliability.

The said technical result is achieved owing to the fact that the pressurized water reactor containment internal passive heat removal system with at least one cooling water circulation circuit comprises a heat exchanger located inside the containment and including an upper header and a lower header interconnected by heat-exchange tubes, a riser pipeline and a downtake pipeline connected to the heat exchanger, a cooling water supply tank located above the heat exchanger outside the containment and connected to the downtake pipeline, a steam relief valve connected to the riser pipeline and located in the water supply tank and hydraulically connected to the latter. The heat exchanger is divided into heat-exchanger sections each having upper header sections and lower header sections on the assumption that:

$$L/D \leq 20,$$

where L is the upper header and the lower header section length,
D is the header bore,
the riser pipeline design provides the riser section height no less than:

$$h_{rs} = (\Delta P^c_{res} - \Delta \rho_{he} g h_{he})/\Delta \rho_{rs} g,$$

$$\Delta P^c_{res} = \Delta \rho_{rs} g h_{rs} + \Delta \rho_{he} g h_{he},$$

where $P^c_{res}$ is the circuit total hydraulic resistance,
$h_{he}$ is the heat exchanger height,
g is the gravity factor, $$\Delta \rho_{rs} = \rho_{cw} - (\rho'(1-x) + \rho''x)$$

$$\Delta \rho_{he} = \rho_{cw} - \rho_{hw}$$

Where $\rho_{cw}$ is the downtake pipeline water density,
$\rho_{hw}$ is the riser pipeline water density in the within the heat exchanger height range,
$\rho', \rho''$ are the water and steam saturation density,
x is the mean mass steam quality of the two-phase mixture in the riser section.

The above technical result is also achieved in specific options of the invention owing to the fact that:
 the system includes four channels, each comprising four cooling water circulation circuits,
 at least a part of the riser pipeline from the upper headers of the heat exchanger sections to the steam relief valve has an upward inclination to an angle of at least 10° in relation to the horizontal,
 the riser pipeline includes sections with an inclination angle of less than 10° in relation to the horizontal, the length of such sections is $L_{sec1}$ and the bore is $D_{sec1}$ meeting the following criterion: $L_{sec1}/D_{sec1} \leq 10$, at least a part of the downtake pipeline has a downward inclination to an angle of at least 10° in relation to the horizontal, the downtake pipeline includes sections with an inclination angle of less than 10° in relation to the horizontal line, the length of such sections is $L_{sec2}$ and the bore is $D_{sec2}$ meeting the following criterion: $L_{sec1}/D_{sec1} \leq 10$, the heat-exchange tube height ensures that the criterion of the turbulent convection on the heat exchanger outer surface is met, namely:

$$R_a > 4 \cdot 10^{12},$$

where $$R_a = \frac{gl^3 S_c}{v^2} \cdot \frac{\rho_w - \rho_c}{\rho_c}$$

$R_a$ is the Rayleigh criterion,
g is the gravity factor,
l is the heat exchanger tube height,
v is the steam-air kinematic viscosity coefficient,
$\rho_w$ is the steam-air medium density on the outer wall of the heat exchanger tubing,
$\rho_c$ is the steam-water medium density in the containment, $$S_c = \frac{v}{D_{dif}}$$

is the Schmidt number,
$D_{dif}$ is the steam diffusion factor.

the heat exchanger is located under the containment dome,
the heat exchanger section has a single-row vertical bundle,
the spacing between any adjacent tubes in the heat exchanger section meets the equivalent plane wall criterion.

For the purposes of this application, the riser section means the portion of the riser pipeline where the coolant is a steam-water (two-phase) mixture with mean mass steam quality x. The section is referred to as "riser" as it makes a major contribution to development of natural circulation in the circuit and determines its intensity.

The experiments conducted show that the above system parameter correlations provide the most efficient heat removal without water hammering or coolant mass-flow rate perturbation due to selection of the best system geometry: the correlation between the length and bore of the heat exchanger header sections, length of the circulation circuit riser section, height of the heat-exchange tubes and optimized arrangement of the system heat exchangers in the containment.

The correlation of the section length and bore of the heat exchanger headers is selected so as to minimize the non-uniformity of coolant flow distribution among the heat exchanger tubes, i.e. to reduce the so-called "header effect". The uniform distribution of flow in the tubing is one of the main conditions for improved energy efficiency and performance of heat exchangers. One of the methods used to improve coolant distribution among the header heat exchanger channels is pressure loss reduction of the medium flow in the header. This is achieved by reducing the header length and increasing its bore within the device manufacturing process capabilities and other design features. For headers meting the $L/D \leq 20$ criterion, pressure loss along the header length is minimal, and distribution of coolant flows among the heat exchanger tubes is the most uniform. When the said criterion is exceeded, the uniformity of medium distribution among the heat exchanger channels degrades, which results in the coolant mass flow instability and perturbation and, subsequently, reduced heat output of the heat exchanger.

BRIEF DESCRIPTION OF THE DRAWINGS

The design of the invention is illustrated by drawings, where.

DETAILED DESCRIPTION

The claimed system is a combination of cooling water circulation circuits. In the preferable embodiment of the invention, the claimed system consists of four completely independent channels, each comprising four such circulation circuits.

Figure 1:
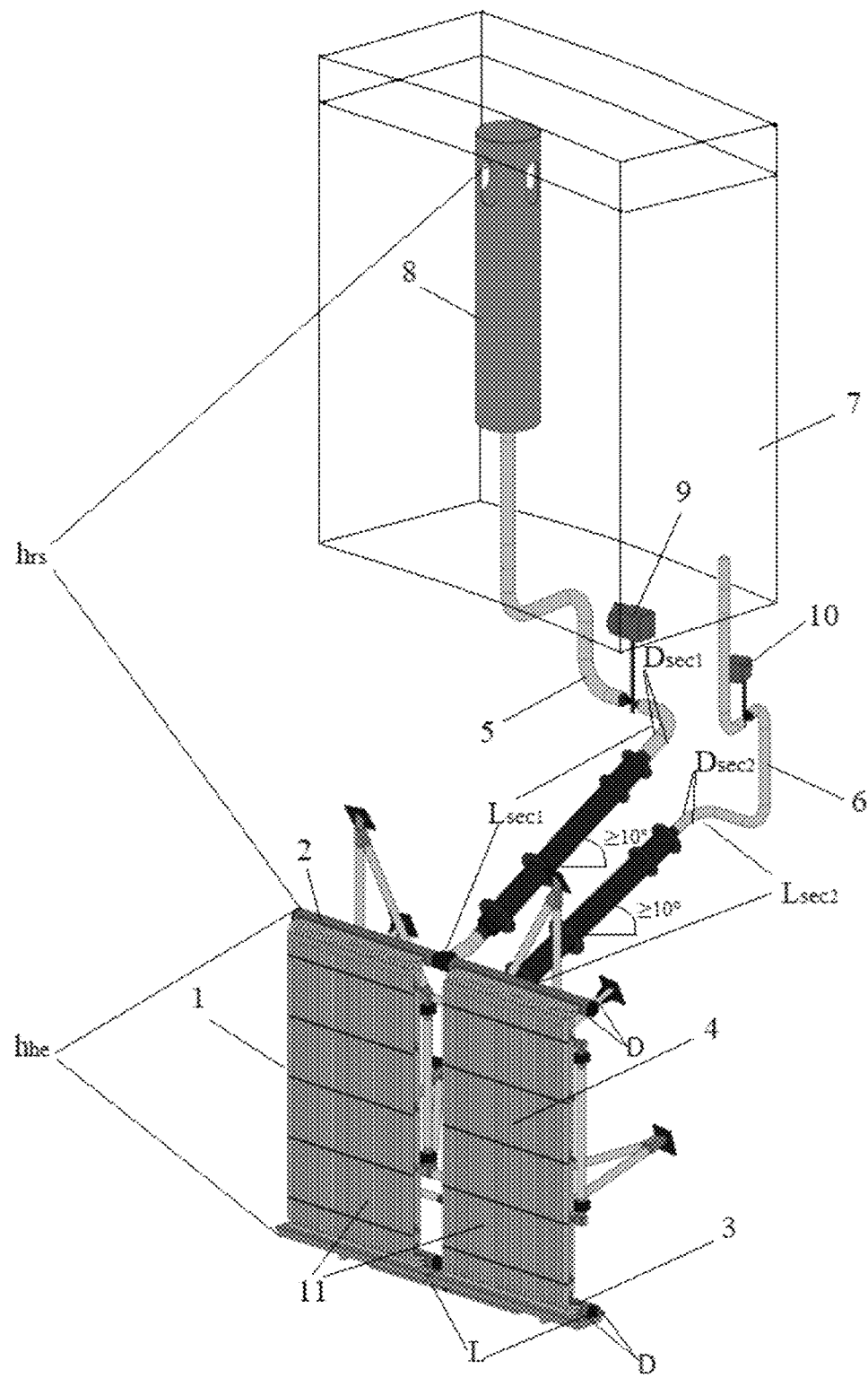
FIG. 1 shows the cooling water circulation circuit design.

The circulation circuit (FIG. 1) comprises a heat exchanger (1) located inside the containment (under the dome) and including an upper header (2) and a lower header (3) interconnected by heat-exchange tubes (4) forming a single-row vertical heat-exchange bundle. A riser pipeline (5) and a downtake pipeline (6) are connected to the heat exchanger (1). A cooling water supply tank (emergency heat removal tank (EHRT)) (7) connected to the downtake pipeline (6) is located above the heat exchanger outside the containment. A steam relief valve (8) connected to the riser pipeline (5) is located in the cooling water supply tank (7) and connected to the same hydraulically. The steam relief valve (8) is designed for elimination of condensate-induced water hammer and increased vibration level in the system riser pipeline (5). The riser pipe of the steam relief valve (8) has a connection hole enabling it to fulfill these functions.

The upper header (2) and the lower header (3) of the heat exchanger are divided into heat-exchange tube sections (11) on the assumption that:

$$L/D \leq 20,$$

where L is the upper header and the lower header section length,
D is the header bore,
the riser pipeline design provides the riser section height $h_{rs}$ to meet the following criterion:

$$h_{rs} = (\Delta P^c_{res} - \Delta \rho_{he} g h_{he})/\Delta \rho_{rs} g,$$

$$\Delta P^c_{res} = \Delta \rho_{rs} g h_{rs} + \Delta \rho_{he} g h_{he},$$

where $P^c_{res}$ is the circuit total hydraulic resistance,
$h_{he}$ is the heat exchanger height,
g is the gravity factor, $$\Delta \rho_{rs} = \rho_{cw} - (\rho'(1-x) + \rho''x)$$

$$\Delta \rho_{he} = \rho_{cw} - \rho_{hw}$$

$\rho_{cw}$ is the downtake pipeline water density,
$\rho_{hw}$ is the riser pipeline water density in the within the heat exchanger height range,
$\rho', \rho''$ are the water and steam saturation density, x is the mean mass steam quality of the two-phase mixture in the riser section.

The heat exchanger section has a single-row vertical bundle. It is preferable that the spacing between any adjacent section tubes meets the equivalent plane wall criterion.

In the preferable embodiment of the invention, the heat-exchange tube height ensures that the criterion of the turbulent convection on the heat exchanger outer surface is met, namely:

$$R_a > 4 \cdot 10^{12},$$

where $$R_a = \frac{gl^3 S_c}{v^2} \cdot \frac{\rho_w - \rho_c}{\rho_c},$$

$R_a$ is the Rayleigh criterion,
g is the gravity factor,
l is the heat exchanger tube height,
v is the steam-air kinematic viscosity coefficient,
$\rho_w$ is the steam-air medium density on the outer wall of the heat exchanger tubing,
$\rho_c$ is the steam-water medium density in the containment, $$S_c = \frac{v}{D_{dif}}$$

is the Schmidt number,
$D_{dif}$ is the steam diffusion factor.

The riser pipeline from the upper heat exchanger section headers to the steam relief valve has an upward inclination to the angle of a least 10° in relation to the horizontal, except for certain sections with an inclination less than 10°, having length $L_{sec1}$ and bore $D_{sec1}$ meeting the following criterion: $L_{sec1}/D_{sec1} \leq 10$.

The downtake pipeline has a downward inclination to the angle of a least 10° in relation to the horizontal line, with the exception of certain sections with an inclination less than 10°, length $L_{sec2}$ and the bore is $D_{sec2}$ meeting the following criterion:

$$L_{sec2}/D_{sec2} \leq 10.$$

In the specific embodiment of the invention for the Leningrad-2 NPP reactor plant, the heat exchangers (1) of the circuits are located along the perimeter on the containment inner wall above elevation 49.3 m. Each heat exchanger has a heat-exchange area of 75 m². The heat-exchange bundle height is 5 m and is built up by 38×3 mm vertical tubes. The total heat-exchange area of each channel amounts to 300 m². The length (L) of the upper and lower sections of the heat exchanger headers equals 2,755. The outer/inner diameter (D) of the upper header is 219/195 mm, the one of the lower header is 191/174 mm.

The system heat output is selected so as to reduce and maintain pressure in the containment inside pressure within the design limits during beyond design basis accidents of reactors, including those involving severe core damage.

Isolating valves (9) and (10) designed for isolation of the heat exchanger (1) in the event of its leakage are mounted on the riser pipeline (5) and downtake pipeline (6). To prevent overpressurization of the C PHRS circuits in case of emergency closing of the isolating valves, safety valves (not shown) are installed to discharge fluid below the tank (7) level.

The isolating and safety valves are located in the reactor building envelope annulus compartments at elevation +54.45 m.

The claimed system operation is based on coolant natural circulation and requires no startup actions. Heat energy is removed from the containment by steam condensation from the steam-air mixture on the outer surface of the heat exchanger (1) from where it is transferred to the water supply tank (7) by means of natural circulation. Heat is ultimately removed from the water supply tank to the ultimate heat sink by evaporation of the water in the tank. The coolant is supplied from the steam relief valve (8) to the cooling water supply tank (7), followed by the cooled coolant (water) return to the heat exchanger (1) through the downtake pipeline (6). Thus, heat energy is transferred from the containment internal volume to the ultimate heat sink, the environment, by means of evaporation of the water in the tank (7) using the circulation circuit.

For experimental justification of the proposed system design efficiency, a significant amount of experimental work has been performed on several experimental setups.

Research has been performed on a full-scale model of the C PHRS cooling circuit installed on the JSC "Afrikantov OKBM" test stand. The C PHRS circuit model included a heat-exchanger-condenser model, operational pipelines located in the containment model tank, and an operational steam relief valve located in the water supply tank.

The heat removal capacity of the tested cooling circuit and parameters of the steam-gas medium in the tank are approximated to the actual reactor accident conditions of the operational system to the maximum extent. Therefore, with the geometry and parameters of the C PHRS cooling circuit practically comparable to the full-scale cooling circuit design, the research results obtained for the C PHRS cooling circuit model are representative and may be applied to the operational C PHRS cooling circuit.

The tests performed on the full-scale C PHRS cooling circuit loop shows that at the maximum cooling water temperature of 100° C. in the cooling water tank, and the specified design capacity per cooling circuit loop, the pressure in the tank will not exceed the design limit pressure of 500 kPa.

Figure 2:
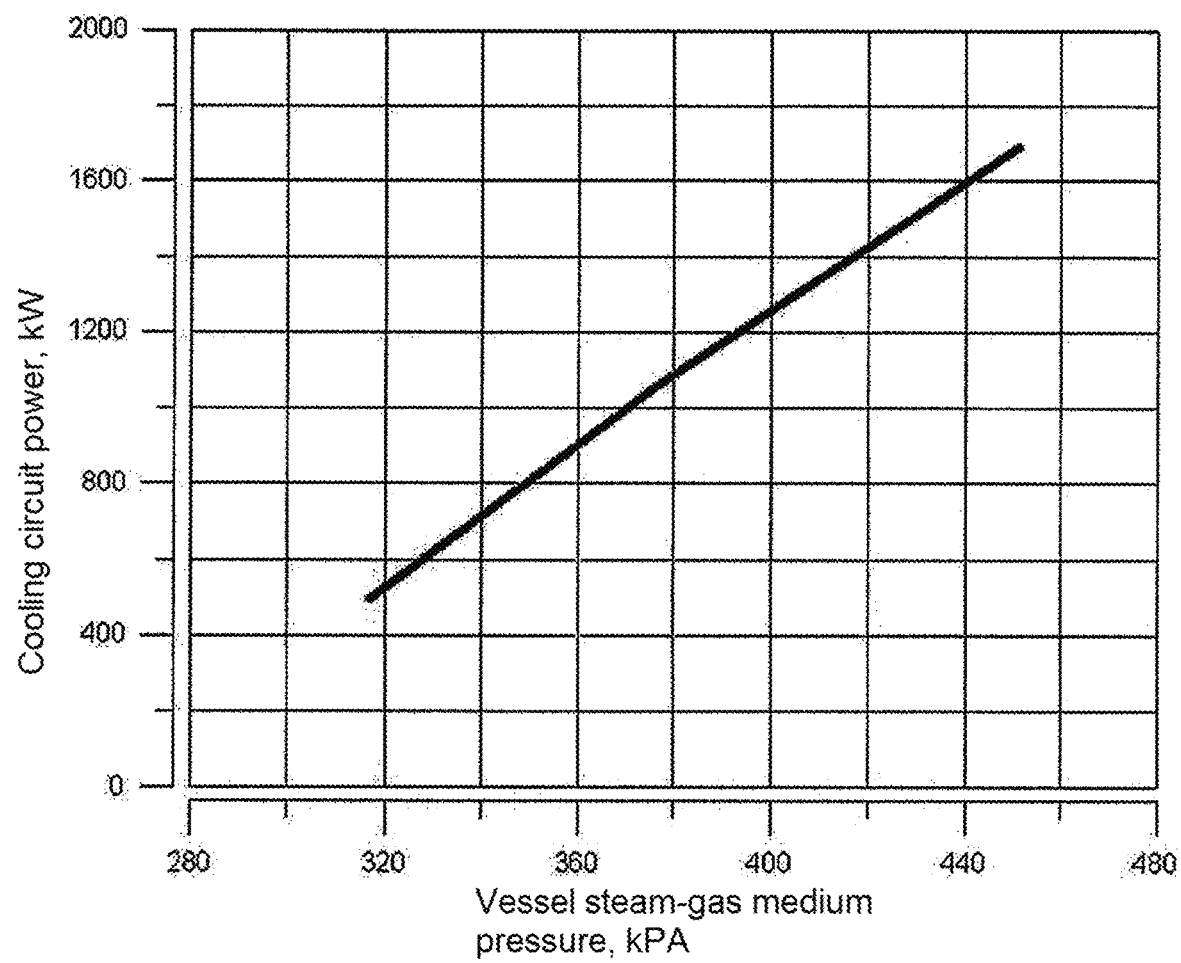
FIG. 2 shows the experimental dependence of the C PHRS cooling circuit output on the pressure of the steam-gas fluid in the tank.

FIG. 2 shows the experimental dependence of the C PHRS cooling circuit output on the pressure of the steam-gas fluid in the tank.

Figure 3:
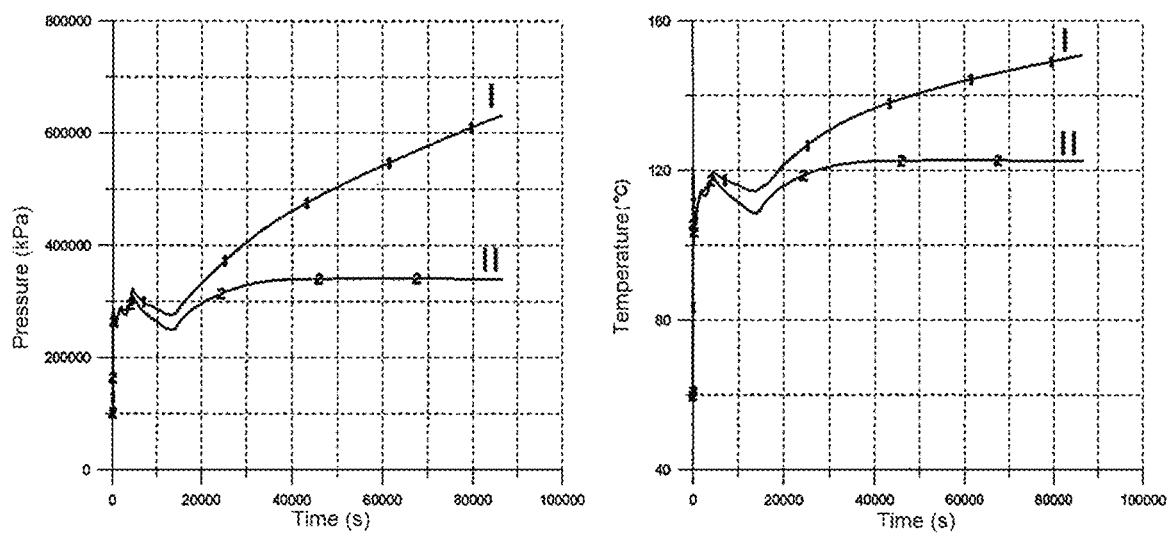
FIG. 3 shows the calculated dependency of pressure and temperature on time in the course of an accident.

FIG. 3 shows how the functioning of the C PHRS influences parameters inside the containment in case of a beyond design basis accident involving depressurization of the reactor plant primary circuit (large leak) and safety system failure (line I shows parameters without PHRS operation, and line II shows parameters with PHRS operation).

The full-scale C PHRS cooling circuit model tests performed show that the circuit design parameters are met both in terms of heat removal efficiency and circuit flow stability. Within the whole range of cooling circuit operation (power operation from the initial state to water boiling), no water hammering in the tank or vibration of the elements and structures of the tested circuit were observed that could affect its operability.

Therefore, the claimed system allows to maintain the pressure under the containment below the design level without operator's intervention for a long period of time and within the whole range of beyond design basis accidents involving release of mass and energy under the containment.

The invention claimed is:

1. A pressurized water reactor containment internal passive heat removal system with at least one cooling water circulation circuit, comprising:
   a heat exchanger located inside the containment and comprising an upper header and a lower header interconnected by heat-exchange tubes,
   a riser pipeline and a downtake pipeline connected to the heat exchanger,
   a cooling water supply tank located above the heat exchanger outside the containment and connected to the downtake pipeline, and
   a steam relief valve connected to the riser pipeline, located in the water supply tank and connected to the same hydraulically, wherein the heat exchanger is divided into heat exchanger sections each having an upper header section and a lower header section, each of the upper header sections and the lower header sections satisfying the relationship:

$L/D \leq 20$, where L is the length of the respective upper or lower header section,
   D is the header bore of the respective upper or lower header section;
   wherein the riser pipeline is configured so that the riser section height $h_{rs}$ is no less than:

$h_{rs} = (\Delta P^c_{res} - \Delta \rho_{he} g h_{he})/\Delta \rho_{rs} g$, $\Delta P^c_{res} = \Delta \rho_{rs} g h_{rs} + \Delta \rho_{he} g h_{he}$, where $P^c_{res}$ is the circuit total hydraulic resistance,
   $h_{he}$ is the heat exchanger height,
   g is the gravity factor, $\Delta \rho_{rs} = \rho_{cw} - (\rho'(1-x) + \rho''x)$ $\Delta \rho_{he} = \rho_{cw} - \rho_{hw}$ $\rho_{cw}$ is the downtake pipeline water density,
   $\rho_{hw}$ is the riser pipeline water density within the heat exchanger height range,
   $\rho', \rho''$ are the water and steam saturation density, and
   x is the mean mass steam quality of the two-phase mixture in the riser section.

2. A system according to claim 1, wherein at least a part of the riser pipeline from the upper headers of the heat exchanger sections to the steam relief valve is inclined upwards from horizontal at an angle of at least 10°.

3. A system according to claim 2, wherein the riser pipeline includes sections with an inclination angle of less than 10° in relation to horizontal, the length of such sections is $L_{sec1}$ and the bore is $D_{sec1}$ meeting the following criterion:

$L_{sec1}/D_{sec1} \leq 10$.

4. A system according to claim 1, wherein at least a part of the downtake pipeline has a downward inclination to an angle of at least 10° in relation to horizontal.

5. A system according to claim 4, wherein the downtake pipeline includes sections with an inclination angle of less than 10° in relation to horizontal, the length of such sections is $L_{sec2}$ and the bore is $D_{sec2}$ meeting the following criterion:

$L_{sec2}/D_{sec2} \leq 10$.

6. A system according to claim 1, wherein the heat-exchange tubes have a height allowing to meet the criteria of turbulent convection on the heat exchanger outer surface, namely:

$R_a > 4 \cdot 10^{12}$, where $$R_a = \frac{gl^3 S_c}{v^2} \cdot \frac{\rho_w - \rho_c}{\rho_c},$$

$R_a$ is the Rayleigh criterion,
   g is the gravity factor,
   l is the heat exchanger tube height,
   v is the steam-air kinematic viscosity coefficient,
   $\rho_w$ is the steam-air medium density on the outer wall of the heat exchanger tubing,
   $\rho_c$ is the steam-water medium density in the containment, $$S_c = \frac{v}{D_{dif}}$$

is the Schmidt number, and
   $D_{dif}$ is the steam diffusion factor.

7. A system according to claim 1, wherein the heat exchanger section has a single-row vertical bundle.

* * * * *